Figure 1:
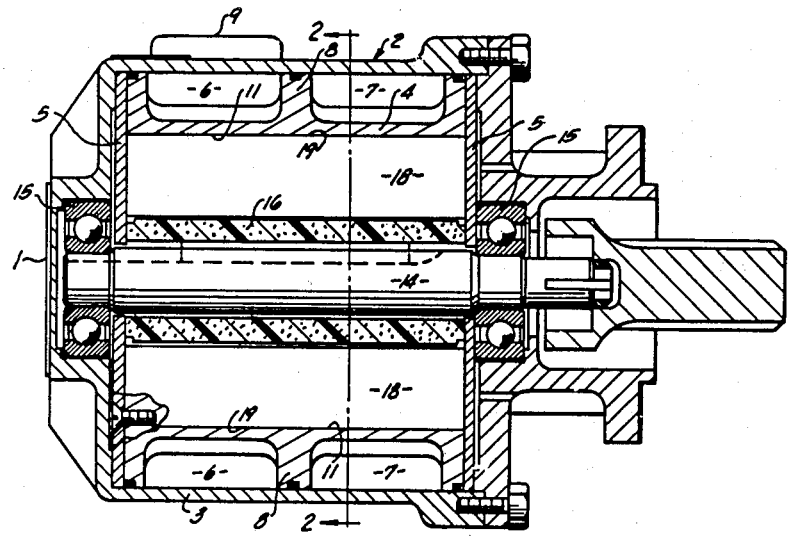

June 29, 1965   H. W. KAATZ ETAL   3,191,852
MECHANICAL CARBON PARTS
Filed April 4, 1962

INVENTORS
HERBERT W. KAATZ
LEO TOBACMAN
BY Bosworth, Sessions,
Henshaw & Brooks
ATTORNEYS 3,191,852
MECHANICAL CARBON PARTS
Herbert W. Kaatz, Elyria, and Leo Tobacman, Cleveland Heights, Ohio, assignors to Randolph Mfg. Co., Cleveland, Ohio, a corporation of Ohio
Filed Apr. 4, 1962, Ser. No. 185,073
12 Claims. (Cl. 230—152)

This invention relates to mechanical carbon and more particularly to methods and means for inhibiting wear between frictionally engaged and relatively slidable mechanical carbon parts operating in atmospheres having widely varying partial pressures of natural film-forming constituents of the atmosphere such as water vapor and oxygen. Specifically, our invention relates to methods and means for inhibiting wear between the relatively slidable mechanical carbon slotted rotor and blades or vanes of a sliding vane type dry vacuum pump for use and operation in aircraft under widely varying partial pressures of water vapor and/or oxygen corresponding generally to changes in atmospheric conditions encountered in light aircraft operation.

Broadly, the use and the art of making mechanical carbon parts is old and well known and comprises generally the steps of mechanically mixing powdered graphite and carbon with a suitable organic binder in appropriate proportions, pressing the mixture together into blocks or molds under relatively high pressures, and then baking the molded mass. After cooling, the baked and pressure molded mass will be found to be firmly bonded into a solid block of material having suitable physical characteristics to permit its being cut and/or machined into various shapes and forms.

Mechanical carbon parts formed as generally described above have been employed in certain applications requiring unlubricated, unidirectional and reciprocating sliding contact between two carbon parts and between a carbon part and a solid structure of another material such as metal without disproportionate and/or unexpected amounts of friction between and wear of the relatively movable parts if operated in atmospheres containing suitable partial pressures of natural film-forming constituents such as water vapor and oxygen. In operating atmospheres having reduced partial pressures of natural film-forming constituents as are frequently and normally encountered, for example, in the earth's atmosphere, the wear on and between such mechanical carbon parts sharply increases and reaches very substantial and undesirable proportions when such partial pressures of, for example, water vapor and/or oxygen present in the operating atmosphere fall below a rather well-defined and predictable limit. While the partial pressures of water vapor and oxygen are probably the principal natural film-forming constituents in the atmosphere and when we only mention them expressly in the description which follows, we do not mean to exclude others but only to employ a convenience of expression.

Previous work in high altitude aircraft electric motor and carbon brush development suggests that the sensitivity of graphitic carbon materials to the partial pressures of water vapor and/or oxygen are part of the mechanism for friction and wear characteristics between carbon surfaces. A theory of the sliding friction characteristics of graphitic carbon materials has been explained in terms of the octagonal platelet structure of the individual carbon molecules. The platelets are relatively flat and thin and have large area octagonal faces on their opposite sides. When carbon is molded and sintered or otherwise made into mechanical parts, these octagonal platelets are randomly distributed throughout the material. However, when this same material is caused to operate in sliding friction, either with itself or a compatible mating surface, the octagonal platelets are caused to align themselves and remain in layers with their largest flat surfaces parallel to the faces of the sliding friction. This layer type orientation gives rise to the familiar sheen observed when carbon surfaces are exposed to friction loads. In this particular orientation, the molecules slide one upon another and are held in position by molecular binding forces between them.

It is also apparent that the coefficient of sliding friction between graphitic carbon materials is peculiarly related to the lubricant film that is allowed to exist between adjacent mating and sliding areas. Although the chemistry of this lubricating film is complicated by the various oxide compounds that result when the lubricant film comes in contact with the mating areas, the fact remains that the coefficient of friction is extremely sensitive to the presence or absence of the lubricating film.

It is also believed that the lubricant film and thus the coefficient of friction between carbon interfaces is directly dependent upon the partial pressures of natural film-forming constituents in the atmosphere between the sliding parts. The critical load limit of the partial pressures of water vapor and/or oxygen is apparently that point where the lubricant film is inadequate and the friction forces between mating carbon surfaces exceeds the molecular binding forces between layers of octagonal carbon platelets. When carbon parts are in sliding engagement in atmospheres having partial pressures of water vapor and/or oxygen below the critical load limit, the platelets cease to remain in a layer and, in the case of reciprocating motion, they flip-flop through 180° of rotation presenting alternately one platelet face and then the other to the moving interface. The extreme hardness of the individual carbon platelet crystals causes extremely high localized loading and the process of rapid attrition accompanied by high temperatures begins.

Whatever the particular explanation may be, we have found that in dry vacuum pumps of the sliding vane type and having both slotted rotors and vanes therein of mechanical carbon operating in a plated bore of a cast iron casing that the life of the pump can be reduced through wear of the carbon parts by a factor of 1000 or more when the pump is operated in atmospheres having reduced partial pressures of water vapor and/or oxygen. The rate of wear in such a pump operating under conditions most favorable for wear is most severe on the trailing or vacuum side of the vanes due to mechanical forces imposed by tip drag of the vanes along the bore of the casing, pneumatic forces tending to urge the trailing sides of the vanes into tighter sliding engagement with the mating walls of the rotor slots, reduced total pressures and the attendant reduced partial pressures of water vapor and/or oxygen on the trailing or vacuum side of the vanes and the operating temperatures developed.

Thus, the problem with which this invention is concerned is that of providing mechanical carbon parts which are relatively movable with respect to each other and with respect to metallic parts and, in particular, mechanical carbon rotor and vane parts operating within the plated bore of a metal casing of a sliding vane type dry vacuum pump, by methods and/or means which inhibit high rates of wear between the carbon parts under conditions of reduced partial pressures of the natural film-forming constituents in the atmosphere such as water vapor and oxygen.

Appropos this problem, it is known in the field of cryogenics that severe wear occurring between relatively slidable mechanical carbon parts formed generally as described above when operating in atmospheres containing partial pressures of water vapor and/or oxygen below relatively predictable reduced amounts can be inhibited by impregnating all the mechanical carbon parts with a metal halide. We have verified this approach to the solution of the wear problems posed above through operation of a dry vacuum pump of the sliding vane type having a slotted rotor and vanes of mechanical carbon impregnated with a metal halide and a casing of plated cast iron under variably controllable atmospheric conditions In atmospheres having partial pressures of water vapor and/or oxygen below a critical limit, the pump and its relatively slidable parts operate satisfactorily and without undue friction and/or wear, due apparently to the formation of a film of impregnant between the sliding faces in aid of or in lieu of a film. However, when such a pump is operated at or near sea level atmospheric conditions and under more normal partial pressures of water vapor and/or oxygen, very high frictional forces develop between the relatively slidable carbon parts and the carbon and metal parts as the result of the excessive formation and build-up of films of the impregnant on and between the mating surfaces. Such film is cohesive in nature and markedly increases the forces necessary to move the mating parts relative to each other and builds up to such an extent that the clearances between relatively moving parts are greatly reduced, if not completely eliminated. Under such conditions, operation of the pump is unsatisfactory.

Thus, while the teachings of the cryogenics art are helpful in solving the problems of severe wear between slidably movable carbon parts under conditions of low or cryogenic temperatures and/or partial pressures of water vapor and/or oxygen, they in no way suggest a method or means for insuring their successful operation without undesirable friction and/or wear characteristics throughout a wide range of partial pressures of the water vapor and/or oxygen and especially at relatively higher temperatures and at partial pressures of water vapor and/or oxygen below the critical minimum limit at which severe wear generally occurs. In particular, while the teachings of the cryogenics art would be helpful in buiding a sliding vane type dry vacuum pump having mechanical carbon rotor and vanes solely for operation at cryogenic temperatures and at lower partial pressures of the water vapor and/or oxygen, they are of no help in suggesting how to build such a pump that will operate successfully and without undesirable characteristics at higher temperatures and partial pressures of water vapor and/or oxygen.

In view of the foregoing state of the art, the primary object of our invention is to provide means for permitting and insuring low friction and low wear sliding contact between relatively movable mechanical carbon parts throughout a wide range of temperatures and/or partial pressures of the natural film-forming constituents of the atmosphere such as water vapor and oxygen. A particular object of our invention is to provide a sliding vane type dry vacuum pump having a mechanical carbon rotor and vanes operating within the plated bore of a metal liner or casing at relatively high temperatures and/or in atmospheres having a widely varying range of partial pressures of water vapor and/or oxygen. A further object of our invention is to provide means for permitting and insuring the operation of such a dry vacuum pump at low partial pressures of water vapor and/or oxygen such as are normally experienced throughout the operating range of light aircraft and, in particular, without such undue wear as would appreciably limit the life of such a pump in this service.

Figure 2:
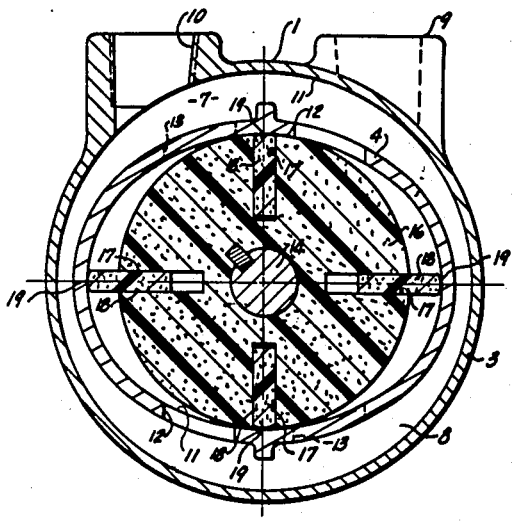

These and other objects and advantages of our invention will become apparent from the following description of a preferred form thereof and particularly as disclosed in the environment of a dry vacuum pump of the type mentioned above, reference being had to the accompanying drawings in which:

FIGURE 1 is a side elevational view in section of a sliding vane dry vacuum pump having relatively slidable mechanical carbon parts and embodying and illustrating our invention; and FIGURE 2 is a section view along the line 2—2 of FIGURE 1.

The following description of our invention is described in connection with the pump indicated generally at 1, albeit it is to be understood that all or part of this invention may be used with other pumps at other apparatus and further that other pumps and other apparatus may be adapted for use according to all or a part of the principles and precepts of our invention.

Pump 1 is a sliding vane type dry vacuum pump particularly adapted for use on light aircraft and to provide a vacuum for the operation of air-driven flight instruments, such as directional gyros and attitude gyros. Under normal conditions of use on light aircraft, such pumps are required to operate in the earth's atmosphere at altitudes of 25,000 feet or more and, accordingly, under widely varying atmospheric conditions and partial pressures of water vapor and/or oxygen.

Pump 1 comprises a stationary double-walled housing indicated generally at 2 having an outer cylindrical wall 3 and an inner, generally ellipsoidal wall 4 arranged concentrically therewith. Inner wall 4 and outer wall 3 are separated by an annular passage of varying radial dimensions enclosed at each end by end plates 5 and divided axially into two portions 6 and 7 by radial wall 8. Openings 9 and 10 from each of portions 6 and 7, respectively, of the annular passage through outer wall 3 are provided as inlet or outlet passages to the pump depending upon the direction of rotation of the shaft.

The interior surface 11 of inner wall 4 defines generally an ellipsoidal pump chamber and is provided with two substantially diametrically opposite ports 12 into right-hand portion 7 of the inter-wall annular passage as well as a similar pair of ports 13 opening into the left-hand portion 6 of the annular passage, both as seen in FIGURE 1. The two pairs of ports 12 and 13 are angularly related with respect to each other in the manner shown in FIGURE 2.

A shaft 14 is mounted for rotation in bearings 15 carried by the stationary casing 2 and concentrically of the interior ellipsoidal surface 11 of inner wall 4. A cylindrical rotor 16 is mounted on and keyed to shaft 14 for rotation therewith. Rotor 16 has a diameter only a few thousandths of an inch less than the least dimension of the interior surface 11 of inner wall 4 and thus effectively divides the pump chamber along its minor axis into two lobes. Rotor 16 is provided with four axially extending radial slots 17 angularly related by 90° to each other. Each of slots 17 receives with a sliding fit and carries a blade or vane 18.

Depending upon the direction of rotation of shaft 14, the pump acts to draw air into one of the axially divided portions 6 and 7 of the inter-wall annular passage through its associated inlet passage and therefrom through the appropriate ports into the lobes of the pump chamber and then to expel the air from the lobes of the pump chamber through the other pair of ports into the other portion of the interwall annular passage in a well-known and conventional manner. Throughout rotation of shaft 14, the tip portions 19 of vanes 18 are held against interior surface 11 of inner wall 4 under substantially high unit pressures by centrifugal force. They are thus constrained to follow the generally ellipsoidal form of surface 11 and are caused to reciprocate in a radial direction with respect to rotor 16 within slots 17 so that the large area side surfaces of vanes 18 are in bi-directional sliding frictional engagement with the walls of slots 17. It will be noted that the trailing large area surface of each of vanes 18 is subjected to a lower pneumatic pressure than is its leading face. This pneumatic pressure differential, together with the drag of tip portion 19 on the interior surface 11 of inner wall 4, tends to produce a greater pressure between the trailing face of each of the vanes and its corresponding slot wall than between the leading face and its corresponding associated slot wall.

In order to operate the pump described above as a dry pump and without a lubricant as employed in so-called wet pumps, we form rotor 16 and vanes 18 of mechanical carbon parts. The ellipsoidal interior surface 11 of inner wall 4 is provided with an electrolized or chromium plated surface. The mechnical carbon parts are formed in a conventional manner by mixing and grinding graphitic carbon, such as Mexican, Ceylon or Madagascar graphite or combinations thereof and synthetic graphites together with amorphous carbon, such as lampblack, and a suitable binder. The mixture is compressed under substantial pressures in a mold of the desired shape and then fired for and at scheduled times and temperatures. The selection of materials, the ratios thereof, the pressures applied during compression and the time and temperature scheduling of the firing of the parts is governed by strength of material considerations and is in accordance with generally accepted and well-known techniques and methods for making mechanical carbon parts.

Mechanical carbon parts of the type described above when employed as rotor 16 and vanes 18 in pump 1 described above operate successfully under normal atmospheric conditions and higher partial pressures of water vapor and/or oxygen. However, at lower partial pressures of water vapor and/or oxygen as may be experienced at altitude or under particularly dry atmospheric conditions, the pump fails through severe wear and especially wear on the trailing surface of the vanes of an order of 1000 times the wear on the vanes under higher partial pressures of the natural film-forming constituents. We have found, however, that by impregnating the mechanical carbon rotor part of the pump assembly with a non-hygroscopic metal halide such as lithium fluoride that the pump will operate successfully at normal or high partial pressures of water vapor and/or oxygen as well as at lower partial pressures of water vapor and/or oxygen without any substantial diminution in the service life of the pump due to unusual and deleterious wear between its relatively slidable mechanical carbon parts.

We prefer to impregnate the mechanical carbon rotor part with approximately two to ten percent by weight of lithium fluoride. This impregnation can be carried out by known and conventional processes for impregnating mechanical carbon parts with metal halide salts such as processes generally similar to those described in United States Patent No. 2,414,514. One process that may be used consists of placing the mechanical carbon rotor parts to be impregnated in a sealed vessel, evacuating the vessel after which molten lithium fluoride is introduced into the vessel, submerging and surrounding the carbon parts. The percentage by weight of impregnation is dependent upon the percent porosity of the mechanical carbon being impregnated. It is generally true that the larger the carbon part is, the fewer pores there are open to the surface. Therefore, the percentage by weight of impregnation that can be achieved in a mechanical carbon part formed to provide a given percentage of porosity varies somewhat inversely with the size of the part.

Our present understanding of the whys and wherefores of the successful operation of a dry vacuum pump such as described above under widely varying conditions of partial pressures of water vapor and/or oxygen when the rotor is formed of a lithium fluoride impregnated mechanical carbon part and the vanes are formed of a non-impregnated mechanical carbon part is found, partially at least, in the ubiquitous nature of the litium fluoride molecule. It appears that in the pump chamber there are present lithium fluoride molecules diffused from the impregnated rotor part in a sufficient quantity and state to provide a useful film-forming function between the tip portions of the vanes and the plated interior surface of the pump chamber and between the slidably engaged surface areas of the vanes and the slot walls in the rotor part under such conditions of partial pressures of water vapor and/or oxygen that would ordinarily induce severe wear of and between the mechanical carbon parts. It also appears that by impregnating only one or two relatively slidable carbon parts in the several combinations of relatively slidable carbon elements comprising the pump that film formations of the impregnant between the relatively slidable carbon parts and between the carbon parts and the plated metal part are restrained to a harmless but useful level and have no undue deleterious effects upon the coefficient of friction therebetween at higher partial pressures of water vapor and/or oxygen.

While it seems advantageous in preventing excessive and friction-producing film formations on the plated interior surface of the pump chamber to select the carbon part to be treated from those not in direct sliding contact therewith, we have successfully employed a modified arrangement of treated and untreated lithium fluoride carbon parts in the combination found in the pump described. This arrangement involves impregnating only one of the four vanes with lithium fluoride. In this arrangement, it appears that the lithium fluoride atoms are sufficiently diffused from the single impregnated vane to provide a useful film between all of the vanes and their associated slots in the rotor under conditions of lower partial pressures of water vapor and/or oxygen and do not provide an excessive formation of film between the vanes and their slots or between the tip portions of the vanes and the interior wall of the pump chamber in spite of the fact that the one metal halide impregnated blade is in direct contact with the chamber surface. We do not completely understand why this particular arrangement of impregnated and non-impregnated mechanical carbon parts in the combination of parts found in the pump described above operates successfully, but we believe that the deleterious effects that might be expected from having an impregnated parts in direct sliding contact with the plated chamber surface are mitigated by the fact that only one of a plurality of vanes sliding in succeeding fashion along the interior wall of the pump chamber in a unidirectional and wiping fashion is impregnated as well as the fact that that part of the tip portion of the vanes in contact with the interior surface of the pump chamber is continuously and rapidly being shifted back and forth to and between an area adjacent the leading side of the vane and an area adjacent the trailing side of the vane.

From the foregoing, it will be apparent that we have found an effective solution to the problem of severe wear between two carbon elements having sliding contact in atmospheres having relatively lower partial pressures of natural film-forming constituents such as water vapor and oxygen. The solution we have found also permits entirely successful operation between two carbon elements in sliding contact in atmospheres containing relatively higher partial pressures of such film-forming constituents. By following the teachings of our invention, relatively slidable carbon elements may be successfully operated at high temperatures and/or in atmospheres containing widely and frequently varying partial pressures of water vapor and/or oxygen and are particularly adapted, though not limited, for use in a sliding vane type dry vacuum pump such as employed on aircraft in connection with vacuum driven instrument systems.

Changes, modifications and improvements may be made to the above-described preferred form of our invention without departing from the precepts and principles of the invention. Therefore, we do not wish our patent to be limited to the particular form of our invention specifically illustrated and described nor in any manner inconsistent with the extent to which our invention has promoted the art.

We claim:
1. The combination of two carbon elements in sliding contact wherein only one of said elements is impregnated with a substantially non-hygroscopic metallic halide.

2. The combination of claim 1 in which said one element is impregnated with lithium fluoride.

3. The combination of claim 1 wherein the other of said elements is free of all halides other than which it acquired from said one element.

4. The combination of claim 3 in which said one element is impregnated with lithium fluoride.

5. In a mechanism having a metallic part and having a plurality of carbon parts in sliding contact with said metallic part and with each other, the improvement that only one of said carbon parts is impregnated with a substantially non-hygroscopic metallic halide.

6. The improvement of claim 5 wherein said one carbon part is impregnated with lithium fluoride.

7. A rotary pump comprising a metallic liner, a carbon rotor part having blade slots, and carbon blade parts engaging said liner and slidably disposed in said slots, the improvement that only one of said carbon parts is impregnated with a substantially non-hygroscopic metallic halide.

8. The improvement of claim 7 wherein said one of said carbon parts is impregnated with lithium fluoride.

9. The improvement of claim 7 wherein said rotor part is impregnated with lithium fluoride.

10. The improvement of claim 7 wherein one of said blades is impregnated with lthihium fluoride.

11. A carbon rotor and carbon blades for a vane type dry vacuum pump, said rotor having slots slidably engaging said carbon blades and having forcible sliding contact therewith, the improvement which comprises that the rotor alone be impregnated with lithium fluoride.

12. The improvement of claim 11 wherein the said rotor is impregnated with said lithium fluoride from about two to about ten percent by weight.

References Cited by the Examiner

UNITED STATES PATENTS

| | | | |
|---|---|---|---|
| 2,414,514 | 1/47 | Elsey | 117—228 |
| 2,418,420 | 4/47 | Moberly | 117—228 |
| 2,817,605 | 12/57 | Sanz et al. | 117—228 |
| 2,818,024 | 12/57 | Herschel | 103—136 |
| 2,860,076 | 11/58 | Smisko | 117—169 |
| 2,925,786 | 2/60 | Hill | 103—136 |
| 2,959,698 | 11/60 | Titus | 117—228 |
| 3,031,342 | 4/62 | Kertesz et al. | 117—228 |

JOSEPH H. BRANSON, Jr., *Primary Examiner.*